(12) United States Patent
Jiang et al.

(10) Patent No.: US 8,041,303 B2
(45) Date of Patent: Oct. 18, 2011

(54) AUTO SNIFFING OF CARRIER PERFORMANCE USING REVERSE ROUND TRIP TIME

(75) Inventors: Zhaowei Charlie Jiang, Palo Alto, CA (US); Steven K. Souders, Los Altos, CA (US); Ramin Naimi, Saratoga, CA (US)

(73) Assignee: Yahoo! Inc., Sunnyvale, CA (US)

( * ) Notice: Subject to any disclaimer, the term of this patent is extended or adjusted under 35 U.S.C. 154(b) by 923 days.

(21) Appl. No.: 11/612,339

(22) Filed: Dec. 18, 2006

(65) Prior Publication Data

US 2008/0146160 A1    Jun. 19, 2008

(51) Int. Cl.
   *H04B 17/00* (2006.01)
(52) U.S. Cl. ............ 455/67.11; 455/419; 455/423; 370/252; 370/253; 370/337
(58) Field of Classification Search ............ 455/423, 455/419, 67.11; 370/252, 253, 337; 709/223, 709/224, 225
See application file for complete search history.

(56) References Cited

U.S. PATENT DOCUMENTS

| | | | | |
|---|---|---|---|---|
| 6,601,098 B1 * | 7/2003 | Case et al. | | 370/253 |
| 2005/0114510 A1 * | 5/2005 | Error et al. | | 709/225 |
| 2006/0168231 A1 * | 7/2006 | DiPerna | | 709/226 |
| 2008/0037420 A1 * | 2/2008 | Tang | | 370/229 |
| 2008/0101253 A1 * | 5/2008 | Shvodian | | 370/252 |

OTHER PUBLICATIONS

See Wikipedia, *Web Bug*, http://en.wikipedia.org/wiki/Web_bug (accessed Mar. 15, 2007).
Smith, See Electronic Frontier Foundation, *The Web Bug FAQ*, http://www.eff.org/Privacy/Marketing/web_bug.html (Nov. 11, 1999) (accessed of Mar. 15, 2007).
See Internet Engineering Task Force, *Transmission Control Protocol*, http://IETF.org/html/rfc793 (Sep. 1991) (accessed of Mar. 15, 2007).

* cited by examiner

*Primary Examiner* — Kamran Afshar
*Assistant Examiner* — Manpreet Matharu
(74) *Attorney, Agent, or Firm* — Frommer Lawrence & Haug LLP; Jamie L. Wiegand

(57) ABSTRACT

A device, system, and method are directed towards employing a beacon to sniff a network metric. When a mobile device requests content from a content server, the content server obtains a beacon be a Uniform Resource Locator (URL) that encodes information about the mobile device, a network carrier, a time the beacon is generated, a connection type, or the like. The beacon may further provide a link to a small image, file, or the like. The beacon may be included with the response to the mobile device. When the mobile device receives the response, it may send a request for content using the beacon's link. A time that the request for the beacon's content is received by a server is recorded. A reverse round trip time (RRTT) may then be determined based on the encoded information and the time the beacon is received.

25 Claims, 3 Drawing Sheets

AUTO SNIFFING OF CARRIER PERFORMANCE USING REVERSE ROUND TRIP TIME

FIELD OF THE INVENTION

The present invention relates generally to mobile communications and, more particularly, but not exclusively to employing a beacon to monitor a reverse network metric for mobile device network traffic.

BACKGROUND OF THE INVENTION

According to some studies, the volume of digital information over a wireless network is expected to continue to increase over the coming years. This may not be so surprising considering that more people are using their mobile phones, and other mobile devices to communicate data over networks. However, with this increased use have come numerous issues regarding network traffic. Often, these issues range from business to consumer response times, to the time required to deliver business information to a traveler using their mobile device, to the download time for rich media such as music, videos, and so forth.

However, for many content providers that employ network carriers to communicate content to their mobile subscribers, there may be little, if any visibility of network slow-downs, dropped connections, disconnects, or the like. In many cases, a content provider may learn about a network carrier's performance problems after the fact, rather than while problems are occurring. Sometimes, the content providers learn about networking problems from disgruntled subscribers that may believe the problems reside with the content provider.

If the content providers were able to access the metrics on a network carrier's performance more quickly, the content provider would be in a better position to respond to networking issues. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION OF THE INVENTION

Figure 1:
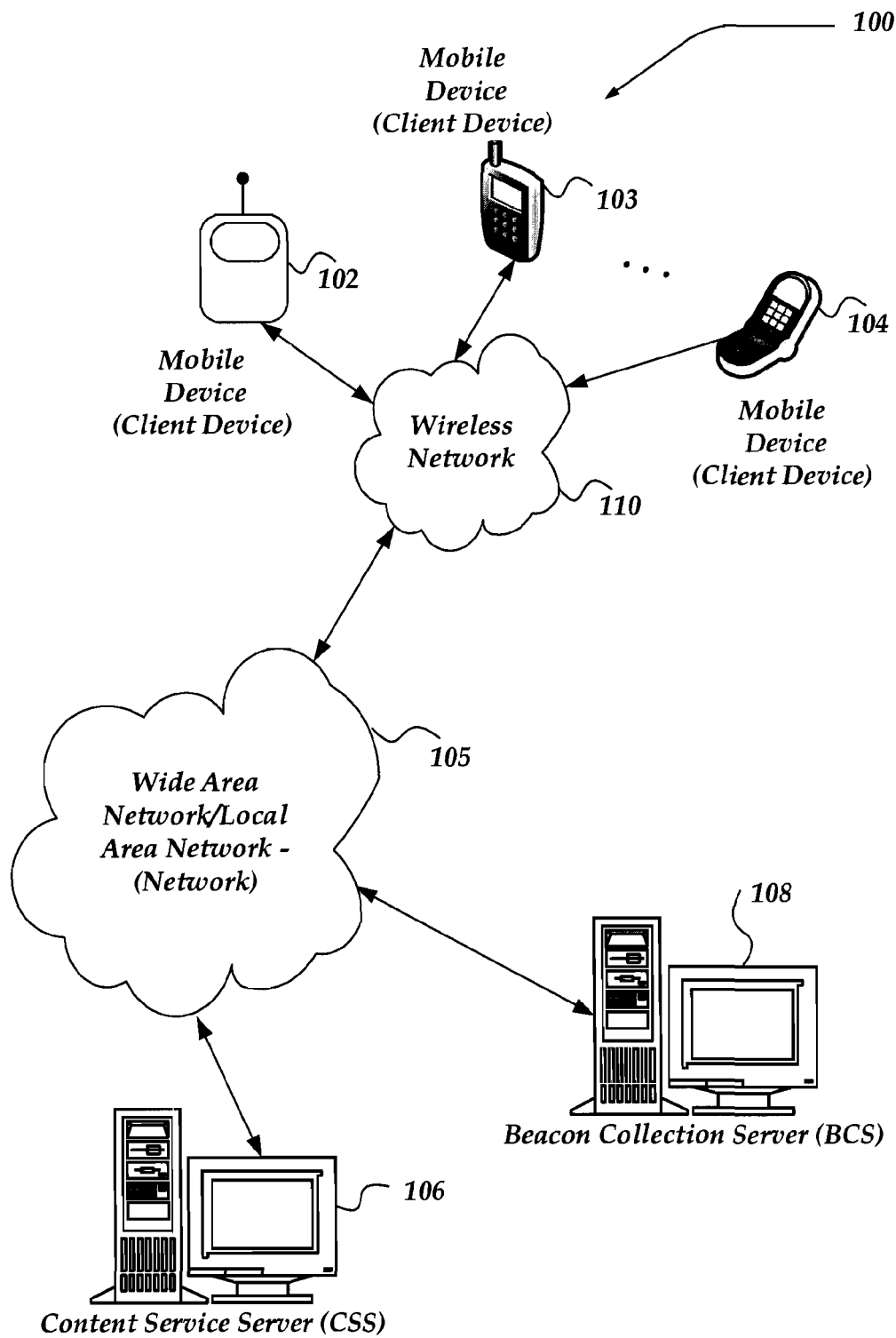
FIG. 1 is a system diagram of one embodiment of an environment in which the invention may be practiced.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Briefly stated the present invention is directed towards employing a beacon to sniff a network metric for a mobile device over the network. When the mobile device requests content from a content server, the content server obtains a beacon. In one embodiment, the beacon is a Uniform Resource Locator (URL). The beacon may include encoded information about the source of the request, a network carrier, a time the beacon is generated, a connection type, as well as other information. In one embodiment, the beacon may be encrypted and/or digitally signed. The beacon may further provide the URL (link) to a small image, file, or other type of document that is configured to provide minimal impact to the mobile device with respect to a display. In one embodiment, the link is to a single pixel sized image. The beacon may then be included with the response to the request from the mobile device. When the mobile device receives the response, the mobile device may send a request for content using the beacon's link. A time that the request for the beacon's content is received by a server is recorded. A reverse round trip time (RRTT) may then be determined based on the encoded information and the time the beacon related request is received. The RRTT and the encoded information may then be used to monitor the performance of the network for the mobile device, the network carrier, or the like. In one embodiment, the RRTT, a smoothed RRTT, or the like, for the mobile device may be used to modify the content provided to the mobile device. The network metrics may also be employed to improve performance for a given mobile device type, network carrier, content, connection type, or the like. For example, in one embodiment, the network metrics may be used to manage a service level agreement with a network carrier, identify issues with a mobile device type, application on a mobile device, a bandwidth, a packet lose count, failures in a network connection, or the like. Thus, for example, based, in part, on a number of beacons provided and a number of requests received based on the beacons, a number of network connection failures may be determined.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")—(network) 105, wireless network 110, Content Service Server (CSS) 106, Beacon Collection Server (BCS) 108, and mobile devices (client devices) 102-104.

Generally, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), extensible Markup Language (XML), and the like, to display and send a message.

Mobile devices 102-104 also may include at least one other client application that is configured to receive content from another computing device. The client application may include a capability to provide and receive textual content, media content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier. The information may also indicate a content format that the mobile device is enabled to employ. Such information may be provided in a message, or the like, that is sent to other computing devices.

In one embodiment, mobile devices 102-104 may provide at least some information about itself through a mobile device profile, sometimes called a mobile user profile. The mobile device profile may be based, in part, on information in a user agent profile, such as that defined by a User Agent Profile Specification available from the Wireless Application Protocol Forum, Ltd. Another example of an information source for use in determining the mobile device profile includes Composite Capability/Preference Profiles (CC/PP), defined by the World Wide Web Consortium. Further examples of profiles describing mobile device capabilities that may be employed include a mobile information device profile (MIDP), a wireless universal resource file (WURFL), and the like. User agent profiles or other similar standardized profiles generally include attributes of a mobile device, such as a screen size, a screen resolution, a memory size, and the like.

Mobile devices 102-104 may also be configured to communicate a message, such as through Short Message Service (SMS), Multimedia Message Service (MMS), instant messaging (IM), internet relay chat (IRC), Mardam-Bey's IRC (mIRC), Jabber, and the like, between another computing device. However, the present invention is not limited to these message protocols, and virtually any other message protocol may be employed. For example, the client application may enable a user to interact with the browser application, email application, VOIP applications, or the like.

Mobile devices 102-104 may further be configured to include a client application that enables the end-user to log into an end-user account that may be managed by another computing device. Such end-user account, for example, may be configured to enable the end-user to receive emails, send/receive IM messages, SMS messages, access selected web pages, participate in a social networking event, or the like. However, access to such information may also be performed without logging into the end-user account.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like. In one embodiment, at least some of wireless network 110 may be managed by one or more network carriers. In one embodiment, a mobile device may employ a single network carrier, such that sending and/or receiving of content using that mobile device employs the single network carrier. However, the invention is not so limited. For example, one network carrier may sublease or employ components of wireless network 110 from another network carrier.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G) generation radio access for cellular systems, WLAN, Wireless Router (WR) mesh, and the like. Access technologies such as 2G, 3G, and future access networks may enable wide area coverage for mobile devices, such as mobile devices 102-104 with various degrees of mobility. For example, wireless network 110 may enable a radio connection through a radio network access such as Global System for Mobile communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between mobile device s 102-104 and another computing device, network, and the like.

Network 105 is configured to couple CSS 106 and BCS 108 with other computing devices, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between computing devices.

In one embodiment, a network carrier may further manage at least some components of network 105. Thus, when a mobile device communicates with another computing device, it may employ components from wireless network 110 and/or components from network 105. In one embodiment a network carrier may be represented by an Internet Service Provider (ISP), a Wireless Service Provider (WSP), or the like.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

Figure 3:
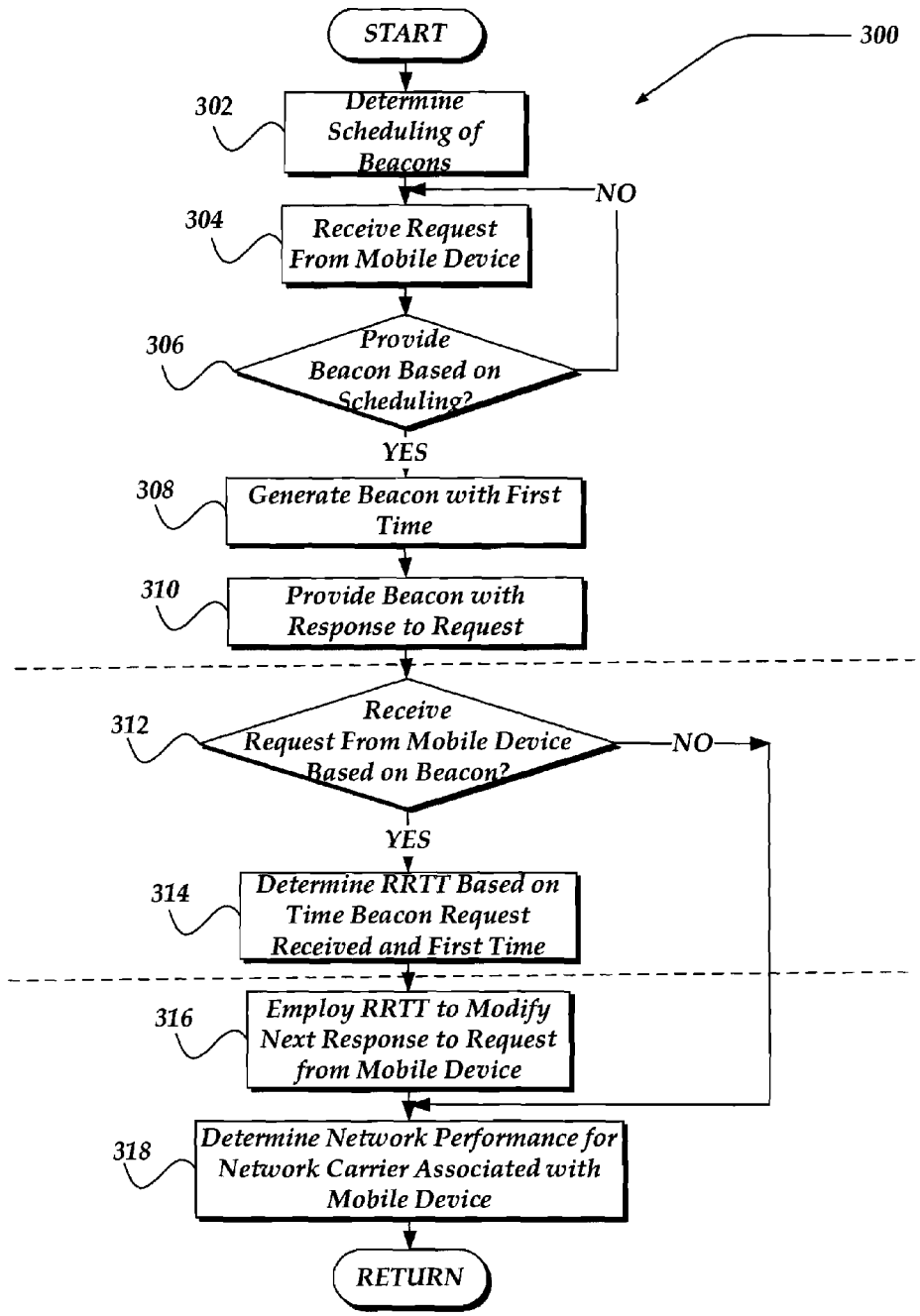
FIG. 3 illustrates a logical flow diagram generally showing one embodiment of a process for using a beacon to sniff a network metric for mobile device traffic over a network, in accordance with the present invention.

One embodiment of CSS 106 is described in more detail below in conjunction with FIG. 3. Briefly, however, CSS 106 may include any computing device capable of connecting to network 105 to provide content in response to a request from another computing device. As such, in one embodiment, CSS 106 may be configured to operate as a website server. However, CSS 106 is not limited to web servers, and may also operate a messaging server, a File Transfer Protocol (FTP) server, a database server, content server, and the like. Additionally, CSS 106 may be configured to perform a variety of different operations. For example, CSS 106 may be configured as a messaging server, and as a database server, or the like.

In any event, CSS 106 may recognize that a request for content is from a mobile device, such as mobile devices 102-104. Moreover CSS 106 may determine based on the request, a characteristic of the mobile device, including, but not limited to a type of the mobile device, a capability of the mobile device, a carrier network associated with the mobile device, or the like. In one embodiment, CSS 106 may determine whether the request is for web based content, and provide such content in a mobile browser compatible format, such as described above.

CSS 106 may further include a beacon manager that is configured to determine a schedule for sending beacons as part of a response to a request for content from a mobile device. In one embodiment, the schedule may be based on a characteristic of a network carrier, a connection type, a mobile device type, a mobile device client application type, a volume of requests, a volume of requests for a particular mobile device type/network carrier combination, or the like. In one embodiment, the schedule may also be based, in part, on a desired quality of a network metric. In another embodiment, the schedule may be based on an adjustable ratio of number of requests per type of mobile device/network carrier combination, or virtually any other ratio of interest in determining a quality of performance of a network carrier. Thus, the schedule may also be determined based on a number of other characteristics of the network carrier's performance, including, but not limited to a prior determined quality of a network metric, a number a network failures, dropped connections, or the like, for that network carrier.

CSS 106 may employ the beacon manager to generate a beacon based on the schedule for a particular request. In one embodiment, the beacon is a Uniform Resource Locator (URL), Uniform Resource Identifier (URI), Uniform Resource Names (URNs), or other type of link, to a file, document, or the like. In one embodiment, the file includes a single pixel sized image. However, the file may include virtually any defined sized image, including 2 pixels, or the like. The intent is to provide a link to a file, or other document, that has minimum impact to a display at the mobile device, but has the mobile device send a message, request, or the like, to BCS 108. It is desirable that the request using the beacon, or the like, is sent as soon as the response that includes the beacon is received by the mobile device. In this manner, a reasonable value of a network metric may be determined by BCS 108. It should be noted, that virtually any other mechanism that generates second signal from the mobile device may also be employed to determine a round trip time, without departing from the scope of the invention.

In any event, the beacon may be also related to a cookie, or the like. For example, a cookie may be provided that includes information associated with the beacon. In one embodiment, the beacon may be an encoded URL, URI, or the like, that encodes a time in which the beacon is generated (or other time associated with the beacon) as well as other information, including, for example, a network carrier identifier, a characteristic of the connection, a characteristic of the mobile device, or the like. In one embodiment, the beacon may be digitally signed and/or encrypted. The digital encryption and/or signature may be performed using any of a variety of encryption mechanisms.

BCS 108 is configured to receive a request from mobile devices 102-104 that is associated with a beacon. BCS 108 may determine whether the received beacon is valid, based, in part, on a digital signature, decryption, or the like. If the beacon is valid, BCS 108 may provide the file, or document associated with the beacon upon receiving the request. In addition, BCS 108 may further determine a second time, where the second time is associated with when the beacon is received by BCS 108. Then, using the first time (e.g., the time the beacon is generated), and the second time, BCS 108 may determine a reverse round trip time (RRTT or R2T2). BCS 108 may also employ a variety of mechanisms to determine a smoothed RRTT. For example, BCS 108 may employ a smoothed RRTT (SRRTT) such as:

$$SRRTT(i+1)=\alpha*SRRTT(i)+(1-\alpha)*RRTT(i),$$

where $\alpha$ is a constant between 0 and 1 that may determine how rapidly the SRRTT adapts to changes, and i represents a time iteration. However, the invention is not so limited, and a variety of other estimates of RRTT, smoothed RRTTs, or the like, may be employed.

BCS 108 may further be configured to collect a variety of other network metrics based on the beacon, including, but not limited to network failures, dropped connections, disconnects, or virtually any other network performance characteristic. BCS 108 may also enable the network metrics, and other performance characteristics to be used to negotiate a service level agreement with a network carrier, identify problems, or the like. In one embodiment, BCS 108 may provide at least some of the network metrics, including the RRTT to CSS 106. CSS 106 in turn may employ the network metrics, in one embodiment, to modify a response to a request from a mobile device. For example, CSS 106 may select to remove an image from a response, modify a resolution of an image in a response, elect to compress content in the response, convert dynamic content to static content, or the like.

Devices that may operate as CSS 106 and BCS 108 include personal computers, desktop computers, multiprocessor systems, microprocessor-based or programmable consumer electronics, network PCs, servers, and the like.

Although FIG. 1 illustrates CSS 106 as distinct from BCS 108, the invention is not so limited. For example, CSS 106 and BCS 108 may be implemented with a single computing device, such as described below in conjunction with FIG. 2. In one embodiment, functions of CSS 106 and BCS 108 may also be distributed across more than two computing devices, without departing from the scope of the invention.

Illustrative Network Device

Figure 2:
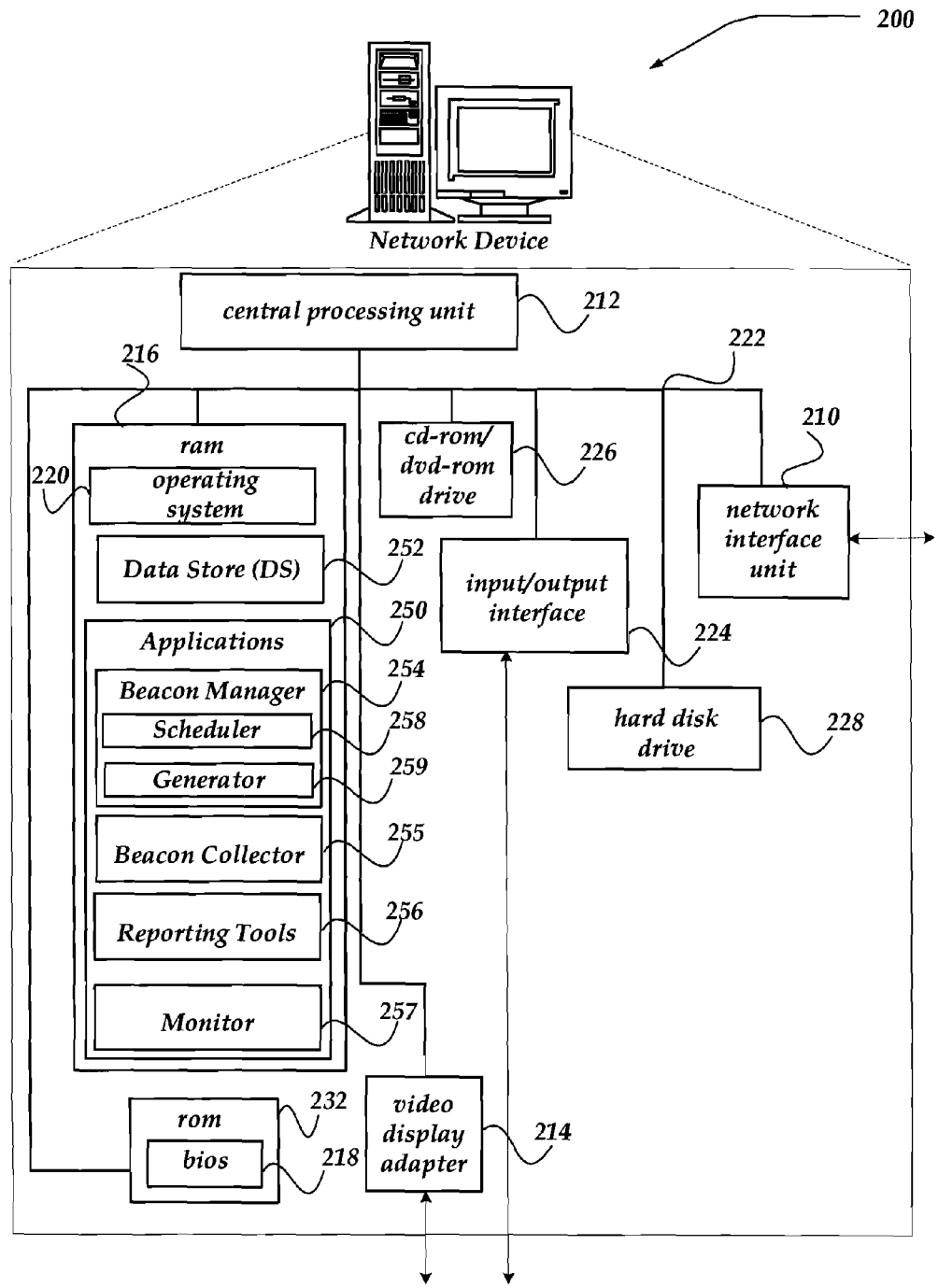
FIG. 2 shows one embodiment of a network device that may be included in a system implementing the invention.

FIG. 2 shows one embodiment of a network device, according to one embodiment of the invention. Network device 200 may include many more components than those shown. The components shown, however, are sufficient to disclose an illustrative embodiment for practicing the invention. Network device 200 may represent, for example, a combined CSS 106 and BCS 108 of FIG. 1.

Network device 200 includes processing unit 212, video display adapter 214, and a mass memory, all in communication with each other via bus 222. The mass memory generally includes RAM 216, ROM 232, and one or more permanent mass storage devices, such as hard disk drive 228, tape drive, optical drive, and/or floppy disk drive. The mass memory stores operating system 220 for controlling the operation of network device 200. Any general-purpose operating system may be employed. Basic input/output system ("BIOS") 218 is also provided for controlling the low-level operation of network device 200. As illustrated in FIG. 2, network device 200 also can communicate with the Internet, or some other communications network, via network interface unit 210, which is constructed for use with various communication protocols including the TCP/IP protocol. Network interface unit 210 is sometimes known as a transceiver, transceiving device, or network interface card (NIC).

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 250 are loaded into mass memory and run on operating system 220. Examples of application programs may include transcoders, schedulers, calendars, database programs, word processing programs, HTTP/HTTPS programs, customizable user interface programs, IPSec applications, encryption programs, security programs, web servers, content servers, FTP servers, and so forth. Beacon manager 254, beacon collector 255, reporting tools 256, and monitor 257 may also be included as application programs within applications 250.

Data Store (DS) 252 stores a plurality of content, and/or beacons. In one embodiment, DS 252 may be a database, a file structure, or the like. DS 252 may store the content for ease of access by a requestor and/or request type. Thus, for example, DS 252 may store the content based on whether it is a file, a web page, a document, an image, or data formats. Moreover, the content may be stored based on whether it is a web request, an FTP request, or the like. In one embodiment the content may be configured and stored based on whether the request is from a mobile device, whether the request is over a high speed or low speed data connection type, or the like.

DS 252 may also be configured to store beacons that may be generated based on a schedule and/or request for content. In one embodiment, the beacons may be stored based on a mobile device, a connection type, a network carrier, the schedule, a generation time, or the like.

Beacon manager 254 may include scheduler 258 and generator 259. Scheduler 258 may be configured to generate and manage a beacon generation/use schedule based on any of a variety of information including, but not limited to a network carrier characteristic, a connection type, an adjustable ratio, a mobile device type, an application on a mobile device, or the like.

Generator 259 may be configured to employ the beacon schedule to determine whether to generate and provide a beacon as part of the response to the mobile device's request. If it is determined that a beacon is to be generated for the request, generator 259 may employ various characteristics of the request to generate the beacon. In one embodiment, the beacon is a URL to a defined pixel sized image. In one embodiment, the defined pixel sized image is a single pixel image. However, the invention is not limited to this, and other documents, files, or the like, may be used.

Generator 259 may further digitally sign, and/or encrypt the beacon, a portion of the beacon, or otherwise, encode information into the beacon. Generator 259 may then provide the beacon to another application for combining it with other portions of a response to the request. In one embodiment, generator 259 may provide the beacon as a URL that is inserted within a portion of a WAP page that represents a response to the request for content from the mobile device.

Beacon collector 255 is configured to receive a request for content that is associated with the beacon. Thus, in one embodiment, when the mobile device receives the beacon, the mobile device may provide a request for the defined pixel sized image using the beacon, or other link, message, signal, or the like. Beacon collector 255 is configured to receive the request, and provide the requested content to the beacon request. Beacon collector 255 is further configured to determine a time associated with when the beacon request is received. Then using the time when the beacon is generated and the time when the beacon request is received, a reverse round trip time (RRTT) may be determined. Moreover, beacon collector 255 may be configured to determine a variety of other network metrics based on the beacon, including a network failure rate, or the like. Beacon collector 255 may provide the determined network metrics to DS 252 for storage.

Reporting tools 256 may be configure to employ the network metrics to determine a performance characteristic for a network carrier. Reporting tools 256 may further be configured to generate a variety of reports that may be used to identify issues associated with a network carrier, a mobile device, a combination of network carrier/mobile device, or the like. Reporting tools 256 may thus be implemented as a spreadsheet tool, a database tool, a script, a program, or the like. In one embodiment, the output of reporting tools 256 may be used to enable negotiations of a network carrier's service level agreement.

Monitor 256 is configured to monitor various thresholds of network metrics, and to provide an alert, or other information based on the network metrics. Thus, for example, monitor 256 may provide an alert that a network carrier is down, or slowing down. In one embodiment monitor 256 may provide feedback to an application, such as a web server, or other content service, regarding problems with a network carrier, mobile device, or the like. The application may then be enabled to use the feedback information to modify a response to a request for content, including removing content, modifying a resolution of content, or the like.

Generalized Operation

The operation of certain aspects of the invention will now be described with respect to FIG. 3. In one embodiment, process 300 of FIG. 3 may be implemented within various components of network device 200 of FIG. 2, or portions of process 300 may be implemented within CSS 106 and/or BCS 108 of FIG. 1. For example, as illustrated by the dashed lines within FIG. 3, blocks 302, 304, 306, 308, and 310 may be implemented with CSS 106 of FIG. 1, while blocks 31 and 314 may be implemented within BCS 108 of FIG. 1. In addition, blocks 316 and/or 318 may be implemented with CSS 106 and/or BCS 108 of FIG. 1.

Process 300 begins, after a start block, at block 302, where a schedule may be determined for providing beacons. In one embodiment, the schedule is determined based on a mobile device type/network carrier combination. However, the schedule may also be determined based on a variety of other factors, including those described above.

Processing then proceeds to block 304, where a request for content is received from a mobile device. The request may include information associated with the mobile device and a network carrier's gateway, interface, or the like. In one embodiment, the mobile device provides a device identifier, such as a device serial number, an ESN, a MIN, and the like. In another embodiment, the associated information indicates whether the mobile device is enabled to accept a cookie. The provided information may further include information about a mobile user agent (UA) executing on the mobile device. The UA information may include a program name, program type, capability identifier, a user profile, or the like. In one embodiment, a mobile user agent, or the like, may be employed to determine various characteristics of the mobile device, including applications available on the mobile device, a mobile device type, or the like. The network carrier's gateway may further provide information associated with the gateway, including an identifier indicating a grouping of the gateway, a characteristic of the network, or the like. Thus, additional information may also be determined based on the request, including, but not limited to a network carrier identifier associated with the request, a connection type, such as whether the connection is a high speed connection, low speed, an HTTP connection, an HTTPS connection, or the like.

Processing continues then to decision block 306, where a determination is made whether to provide a beacon with a response to the request, based, in part, on the schedule. If it is determined that a beacon is to be provided, processing continues to block 308; otherwise, processing may loop back to 304, to receive another request for content.

At block 308, a beacon may be generated for the request. In one embodiment, the beacon is a URL to a defined pixel sized image file. In one embodiment, the URL may encode various characteristics of the mobile device, the network carrier, a first time when the beacon is generated, or the like. In one embodiment, the beacon may be digitally signed, and/or encrypted. In one embodiment the beacon related to a cookie that may include the encoded information. In one embodiment, the cookie may be digitally signed and/or encrypted.

Processing then continues to block 310, where the beacon may be combined with other content associated with the response to the request. For example, in one embodiment, the beacon may be inserted in a WAP page. Processing then flows to decision block 312, where a determination is made whether another request is received from the mobile device, and the other request is further based on the beacon. Thus, in one embodiment, the other request is a request for the defined pixel sized image file associated with the beacon. A beacon oriented request from the mobile device might not be received for a variety of reasons, including a network failure, congested network, a problem with the mobile device, a problem with an application on the mobile device, an action by a user of the mobile device, or the like. If, the request associated with the beacon is received, a time in which the request is received may be determined, and processing flows to block 314; otherwise processing loops to block 318.

At block 314, a reverse round trip time (RRTT) may be determined based on the time when the beacon request is received and the time in which the beacon is generated. Moreover, in one embodiment, a smoothed RRTT may also be determined.

Processing then continues to block 316, where the determined RRTT (or other network metrics, including smoothed RRTT, or the like) may be used to modify a response to another request from the mobile device, a mobile device with similar characteristics, a mobile device/network carrier combination, or the like. Processing flows next to block 318.

At block 318, a variety of other network metrics may also be determined, including an overall network carrier performance, a network carrier performance based on mobile device types, application types, connection types, or any combination of the above, or the like. Such performance metrics may be employed for example to negotiate a network carrier's service level agreement, or the like. Process 300 may then return to a calling process to perform other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A server device to manage a mobile communication, comprising:
    a transceiver to send and receive data over a network; and
    a processor that is operative to perform actions, comprising:
        receiving a first request for content from a mobile device;
        providing in a response to the first request, the first requested content and a beacon associated with a first time;
        determining a second, time based on receiving a second request for other content associated with the beacon;
        determining a reverse round trip time (RRTT) based on the first time and the second time; and
        employing the determined RRTT to modify content for another response to a third request from the mobile device.

2. The server device of claim 1, wherein the beacon further comprises encoded information associated with at least one of the mobile device, a carrier network, the first, time, or a connection type.

3. The server device of claim 1, wherein the beacon further comprises a URL to an image.

4. The server device of claim 1, wherein the beacon further comprises information about the mobile device obtainable from a mobile device user agent.

5. The server device of claim 1, wherein modifying other content further comprises at least one of reducing a resolution of content associated with the other response or removing an image from the content.

6. The server device of claim 1, wherein the processor is operative to perform actions, further comprising:
    providing a plurality of beacons over a period of time for the mobile device and a network carrier;
    determining a plurality of RRTTs over the period of time based on the plurality of beacons; and
    employing the plurality of RRTTs, in part, to determine a network performance for the network carrier.

7. A non-transitory computer-readable medium having computer-executable instructions for determining a network metric for a mobile communications, the computer-executable instructions when installed onto a computing device enable the computing device to perform actions comprising:
    receiving a plurality of requests for content from a plurality of different mobile devices;
    providing the requested content and a different beacon combined within the requested content in response to each of at least a subset of the plurality of requests, wherein each beacon is associated with a first time and a mobile device in a subset of the plurality of different mobile devices;
    receiving another plurality of requests for different content the different content being based on the different beacons;
    determining a second time for each of the received other plurality of requests; and
    determining a plurality of reverse round trip time (RRTT) based on the plurality of first times and the plurality of second times; and
        employing the determined RRTT to modify content for another response to a third request from the mobile device.

8. The non-transitory computer-readable medium of claim 7, the actions further comprising:
    determining a network carrier for each of the plurality of determined RRTTs, and based on the plurality of RRTTs, determining a network carrier performance.

9. The non-transitory computer-readable medium of claim 7, the actions further comprising:
    determining a schedule in which to provide each beacon to the mobile device based in part on at least one of a quantity of requests from a given network carrier, a mobile device type, or a connection type.

10. The non-transitory computer-readable medium of claim 7, wherein each beacon is at least one of digitally encrypted or digitally signed.

11. The non-transitory computer-readable medium of claim 7, each beacon further comprises a URL associated with at least one of a mobile device characteristic, a network carrier, or a time the beacon is generated.

12. A mobile device for use in determining a network metric, comprising:
    a memory component for storing data; and
    a processing component for executing data that enables actions, comprising:
    sending a request for first content;
    receiving the requested first content with an embedded beacon that is associated with a first time;
    performing a request for other content that is associated with the beacon, wherein performing the request for the other content enables a computation of a second time, the first time and the second time being employable to determine a reverse round trip time (RRTT) associated with the mobile device; and
        employing the determined RRTT to modify content for another response to a third request from the mobile device.

13. The mobile device of claim 12, wherein sending the request for content further comprises sending a request that further comprises providing information that includes at least one of a type of the mobile device, a capability of the mobile device, or a carrier network associated with the mobile device.

14. The mobile device of claim 12, wherein the beacon further comprises a URL, and the other content further comprises an image file.

15. A system for determining a network metric for a mobile device, comprising:
- a beacon generator within a network device that is operative to perform actions, including:
- receiving a request for first content from a mobile device; determining at least one characteristic of the mobile device; generating a beacon based in part on a schedule determined by the beacon generator and the at least one characteristic of the mobile device, wherein a first time is associated with the generation of the beacon;
- providing the beacon as part of a response to the request the response further including the requested first content; and
- a beacon collector that is operative to perform actions, including:
- receiving, from the mobile device, a request for other content associated with the beacon;
- determining a second time associated with the receiving of the beacon other content request;
- determining a reverse round trip time (RRTT) based on the first time and the second time for the mobile device; and
- employing the determined RRTT to modify content for another response to a third request from the mobile device.

16. The system of claim 15, wherein the schedule further comprises information associated with the mobile device and a network carrier combination, and indicates how often to provide a beacon to a request for content from the mobile device/network carrier combination.

17. The system of claim 15, wherein determining the at least one characteristic of the mobile device further comprises, determining at least one of a mobile device type, a capability of the mobile device, a network connection type associated with the mobile device, or a network carrier associated with the mobile device.

18. The system of claim 15, wherein the beacon further comprises URL that encodes at least one characteristic of the mobile device.

19. The system of claim 15, wherein the beacon further comprises a link to an image.

20. The system of claim 15, wherein beacon collector that is operative to perform actions, further including:
- employing the RRTT to negotiate a service level agreement with a network carrier.

21. A method operating on a network device for determining a network metric associated with a mobile communication, comprising: receiving a request for first content from the mobile device;
- determining at the network device a schedule associated with the mobile device and a network carrier for the mobile device;
- providing a beacon based on the determined schedule within a response to the request for the first content, the response further including the requested first content;
- receiving a request for other content associated with the beacon,
- determining a reverse round trip time (RRTT) between providing the beacon and receiving the request for other content associated with the beacon; and
- employing the determined RRTT to modify content for another response to a third request from the mobile device.

22. The method of claim 21, wherein the schedule is further based on at least one of a mobile device characteristic, a connection type, a performance characteristic of the network carrier, a quantity of requests from the mobile device, or a desired level of integrity for the network metric.

23. The method of claim 21, wherein the beacon further comprises a URL to a defined pixel sized image.

24. A non-transitory computer-readable storage medium configured to store program instructions for performing the method of claim 21.

25. The method of claim 21, further comprising:
- determining a number of network failures based in part on a number of beacons provided being different from a number of requests for content associated with the beacon being received.

* * * * *

UNITED STATES PATENT AND TRADEMARK OFFICE
CERTIFICATE OF CORRECTION

PATENT NO.        : 8,041,303 B2
APPLICATION NO.   : 11/612339
DATED             : October 18, 2011
INVENTOR(S)       : Zhaowei Charlie Jiang et al.

Page 1 of 1

It is certified that error appears in the above-identified patent and that said Letters Patent is hereby corrected as shown below:

In column 11, line 40, in Claim 1, delete "second," and insert -- second --, therefor.

In column 11, line 49, in Claim 2, delete "first," and insert -- first --, therefor.

Signed and Sealed this
Thirteenth Day of March, 2012

David J. Kappos
*Director of the United States Patent and Trademark Office*